Dec. 31, 1968 L. W. SLIFER, JR 3,419,433
SOLAR CELL AND CIRCUIT ARRAY AND PROCESS FOR
NULLIFYING MAGNETIC FIELDS
Filed May 13, 1966

INVENTOR
Luther W. Slifer, Jr.

BY [signature] [signature] ATTORNEYS

United States Patent Office 3,419,433
Patented Dec. 31, 1968

3,419,433
SOLAR CELL AND CIRCUIT ARRAY AND PROCESS FOR NULLIFYING MAGNETIC FIELDS
Luther W. Slifer, Jr., Lanham, Md., assignor to the United States of America as represented by the Administrator of the National Aeronautics and Space Administration
Filed May 13, 1966, Ser. No. 551,182
13 Claims. (Cl. 136—89)

Figure 1:
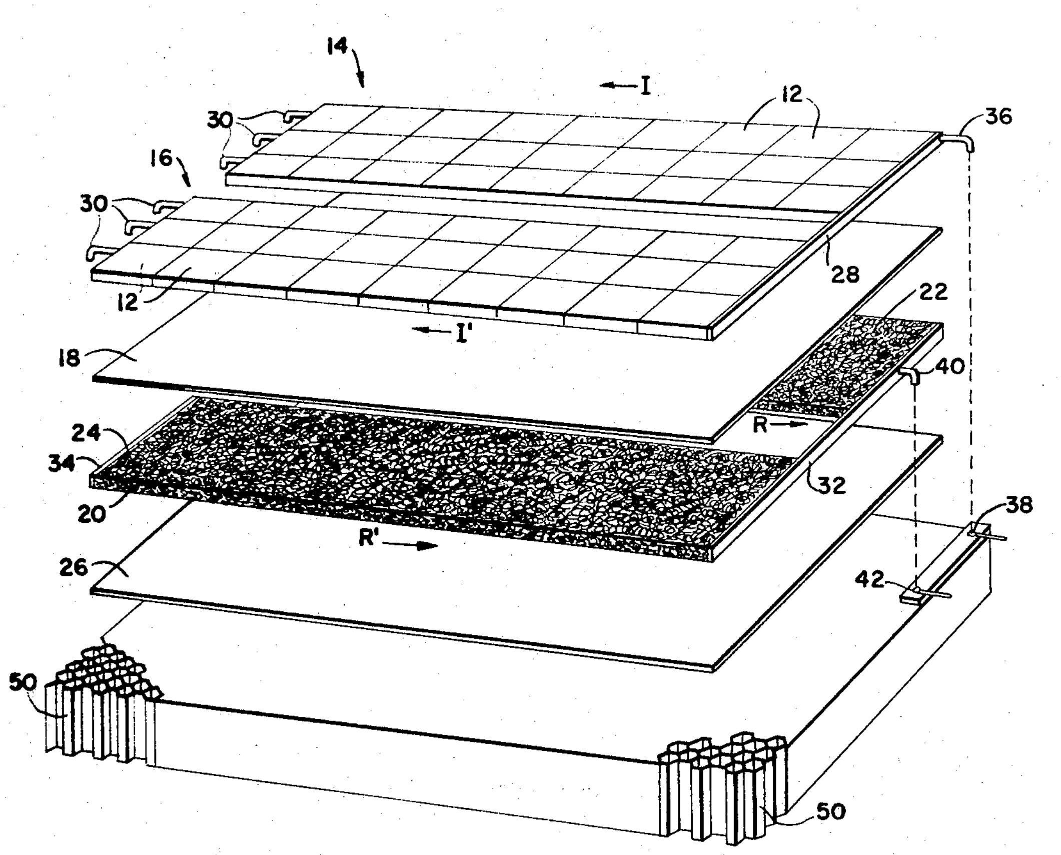

The invention described herein was made by an employee of the United States Government and may be manufactured and used by or for the Government for governmental purposes without the payment of any royalties thereon or therefore.

Electrical current flow through a circuit inherently produces a magnetic field associated with the circuit. Induced magnetic fields of this type are of great value in a wide variety of applications such as motors, solenoids and the like; however, these induced magnetic fields are not desirable in many other devices. This is because induced magnetic fields can create undesirable voltages in conductors lying within such fields. This can be particularly vexatious, for example, in circuits employing vacuum tubes controlled by variations in grid voltage. Similarly, induced magnetic fields are most undesirable in magnetometers which are used for measuring the strength of an environmental magnetic field. Accordingly, it is desirable that the electrical circuitry associated with magnetometers produce a minimal magnetic field. Otherwise, the reading provided by the magnetometer will be affected by the induced magnetic field and will not accurately represent the strength of the environmental magnetic field.

The problem of induced magnetic fields in magnetometer circuits is particularly critical in magnetometer circuits employed in space vehicles. This is true because weight considerations make it impractical to employ the prior art solutions that have been used in earthbound devices.

Induced magnetic fields from electrical circuitry in space vehicles arise largely from the solar cell array which forms the source of electrical power for the vehicle and its associated instruments such as magnetometers. It is particularly difficult to compensate for the induced magnetic fields created by these solar cells. As will be more fully described shortly, this is because the current flow in the solar cells is in the form of sheet current rather than a line current.

Prior art attempts to negate the effects of induced magnetic fields produced by small line current conductors such as wires have been fairly successful. Generally, the method employed is to provide a reverse current wire alongside the wires of the primary circuit. Electrical current is caused to flow in the reverse current wires in a direction opposite to the current flow direction in the associated primary circuit wires. Consequently, the magnetic field in each wire cancels out the magnetic field of the other wire. Many electrical circuits employ relatively thin waferlike circuit elements that can have either flat or curved surfaces of substantial extent as compared with their thickness. Such circuit elements are sometimes referred to as strip conductors. However, no satisfactory solution has been provided for cancelling the induced magnetic field created by such relatively thin waferlike electrical circuit elements due to the fact that such elements are ofttimes characterized by sheet current flow. This is true of both earthbound systems and systems employed in space vehicles.

One previous method employed for reducing the induced magnetic fields produced by thin waferlike solar cell arrays has been the use of a reverse flow wire mounted beneath the solar cells to retrace the cell current path. In those arrays where the solar cells are supported by a honeycomb substrate this wire has been mounted in channels formed within the supporting honeycomb. This solution requires that channels and passageways be machined into the honeycomb substrate. This creates complications in assembly of the device which are both time-consuming and expensive. Furthermore, this solution has not proven to be satisfactory since the magnetic field created by the line current in the wires does not effectively cancel the magnetic field created by the sheet current in the solar cells. Another deficiency of this solution arises from the fact that the channels for the return wires inherently weaken the honeycomb substrate.

Accordingly, the problem of providing a means for cancelling induced magnetic fields in space vehicles having thin waferlike circuit elements has not been satisfactorily accomplished prior to this invention.

In view of the foregoing shortcomings of the prior art attempts to cancel induced magnetic fields created by thin waferlike circuit elements, it is a primary object of this invention to provide means for cancelling such magnetic fields.

It is a further object of this invention to provide means for cancelling magnetic fields induced by thin waferlike circuit elements employed in space vehicles.

Yet another object of this invention is the provision of means for cancelling induced magnetic fields created by thin waferlike circuit elements employed in space vehicles without weakening the supporting honeycomb substrate employed in such vehicles.

A still further object of this invention is the provision of effective and economical means for cancelling induced magnetic fields created by thin waferlike circuit elements.

Yet another object of this invention is the provision of means for cancelling induced magnetic fields created by solar cell circuit arrays employed in space vehicles.

Another object of this invention is the provision of means for cancelling induced magnetic fields induced by solar cell circuit arrays employed in space vehicles which means efficiently cancels such magnetic fields and also strengthens the supporting structure for the solar cell circuit array.

This invention accomplishes the aforementioned objects through the use of a reverse flow circuit array composed of thin waferlike conductive elements arranged in the same pattern as the thin waferlike conductive elements of the primary circuit which produces the magnetic field desired to be cancelled. The reverse flow circuit elements are aligned with, and closely spaced from, the primary circuit elements by a thin layer of insulating material. The primary circuit and the reverse flow circuit are connected by conductive means so that any sheet current flowing through the primary circuit results in a reversed sheet current flowing through the reverse flow circuit. Consequently, the magnetic field produced by each circuit cancels the field produced by the other circuit. Both of the circuits are attached to a supporting honeycomb member so as to form a strong laminated unitary structure having a high strength-to-weight ratio.

Figure 2:
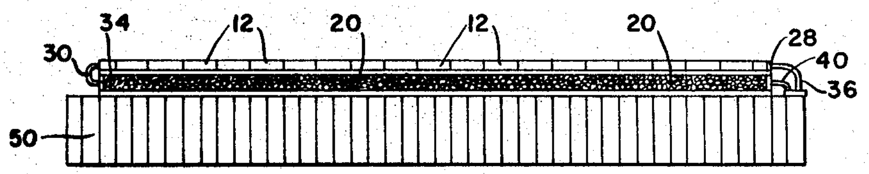

Other objects and advantages of this invention will hereinafter become more fully apparent from the following description of the annexed drawings, which illustrate a preferred embodiment of the invention, and wherein:

FIG. 1 is an exploded perspective view of a preferred embodiment of the invention; and FIG. 2 is a front elevation of the same preferred embodiment.

A preferred embodiment of this invention is illustrated in a space vehicle environment; however, the invention can be employed in a great variety of environments and is not limited to space vehicle applications.

The preferred embodiment illustrated in FIGS. 1 and 2 is incorporated in a laminated structure having five significant layered components. The top layer is comprised of a plurality of conventional thin waferlike rectangular solar cells 12 arranged in first and second banks 14 and 16 respectively. The solar cells 12 of each particular bank are connected so that each bank forms a primary electrical current flow path. A first thin layer of insulating material 18 is located immediately below the solar cell layer. A thin waferlike electrically conductive layer 20 forming a secondary electrical current flow path is located immediately below the first layer of insulating material 18. Electrically conductive layer 20 is preferably formed of an expanded metallic mesh such as silver, for example. However, layer 20 can also be in the form of a solid sheet of conductive metal if desired.

Layer 20 is divided into first and second banks 22 and 24 respectively, each of which is substantially identical in outline with solar cell banks 14 and 16 respectively. Consequently, each of the respective banks 22 and 24 forms a secondary electrical current flow path that is substantially identical in shape with that of its respective solar cell bank. A second thin layer of insulating material 26 is located immediately below layer 20. Insulating layers 18 and 26 are preferably formed from epoxy impregnated fiber glass but other insulating materials can also be used. A primary support member 50 of lightweight honeycomb structure is located immediately beneath insulating layer 26. The primary support member 50 of the preferred embodiment can be formed of metal such as aluminum or it can be formed of fiber glass or other material in honeycomb form. However, it is not imperative that the primary support member be of honeycomb form in other embodiments. For example, it could be in solid sheet form for earthbound devices where weight would not be a critical factor. The aforementioned layers are bonded together to form a unitary laminated structure as shown in FIG. 2. The several different layers forming the laminated structure provide a greatly strengthened structure as compared to the prior devices such as those employing a honeycomb substrate channelled for return current wires. Furthermore, the laminated structure provides far superior magnetic field cancellation than is possible with the prior art devices. Any suitable bonding agent such as epoxy resin can be employed for bonding the respective layers together. In this manner the elements 18, 26 and 50 comprise a mounting means for fixedly supporting conductive layer 20 in a position closely spaced from the layer of solar cells 12.

A common terminal bar 28 connects the right ends of the solar cell banks 14 and 16. The left-hand end of each of the solar banks has three electrically conductive wires 30 extending therefrom as shown. Each wire is associated with a respective horizontal row of solar cells. A common terminal bar 32 of electrically conductive material connects the right ends of each of banks 22 and 24 of layer 20. A flat terminal member 34 is attached to the left end of bank 24. A similar flat terminal member (not illustrated) is attached to the left end of bank 22. The wires 30 associated with solar cell bank 16 are connected to terminal member 34 and the wires 30 associated with bank 14 are connected to the terminal member on the end of bank 22. Electrically conductive lead 36 which is attached to terminal bar 28 is connected to a first output terminal 38. Another electrically conductive member 40 is connected to a second output terminal 42. Any desired electrical load such as a magnetometer is connected to output terminals 38 and 42. While the preferred embodiment is illustrated in the form of thin flat circuit elements, it should be understood that the circuit elements could be curved. For example, the entire laminated structure could be in the form of a cylinder or other non-flat curved surface.

The manner in which the preferred embodiment of this invention functions will now be discussed. Radiant energy, such as from the sun, impinges upon solar cells 12 and creates a voltage in each solar cell. The solar cells are connected so that the resultant electromotive force (voltage) is developed between members 28 and 30 and each bank of solar cells 14 and 16 respectively forms a primary electrical current flow path. The nature of the solar cells is such that the electrical current is in the form of sheet current. The electromotive force developed across bank 14 creates an electrical current flowing in the direction of arrow I in FIG. 1. In a smaller manner the electromotive force developed across bank 16 creates a flow of electrical current in the direction indicated by the arrow I′ in FIG. 1. Moreover, the electrical current flow in each of the solar cell banks 14 and 16 creates an induced magnetic field associated with each bank in a well known manner.

The electrical current flowing in solar cell bank 16 flows in the direction indicated by arrow I′ and thence into bank 24 by means of conductive members 30 and 34. This current then flows in a reverse direction through bank 24 as indicated by the arrow R′ after which it is fed by terminal bar 32 and conductive member 40 to output terminal 42. The electrical current from terminal 42 next flows through a load (not illustrated) and thence to terminal 38. The current from terminal 38 is then conducted through terminal bar 28 by means of conductive means 36. Consequently, it will be seen that a closed loop electrical circuit is provided. The electrical current flowing through solar cell bank 14 follows a similar path in a direction indicated by arrow I in an obvious manner and the current in bank 22 flows in an opposite direction indicated by arrow R.

The electrical currents flowing through banks 22 and 24 are of the sheet variety in the same manner as is the electrical current flowing through solar cell banks 14 and 16. Moreover, the current flowing through bank 24 creates an induced magnetic field of opposite polarity from that induced by the current flowing through bank 16. This is true because the respective currents are flowing in opposite directions. Since the current flowing in solar cell bank 16 is equal to the current flowing in bank 24 and each of the banks is closely spaced to the other, the respective magnetic fields produced by each bank effectively cancel each other. The magnetic field produced by current flowing in bank 14 is cancelled by the magnetic field induced by the current flowing in bank 22 in the same manner.

The electrical connections illustrated can vary with different applications; however, it is essential that the conductive layer 20 which forms the reverse flow circuit be dimensioned so as to coincide with the dimensions of the primary current path. It is also essential that the secondary current in layer 20 flow in the opposite direction from that of the primary path.

While the solar cell banks illustrated are rectangular in form, it should be understood, as noted heretofore, that they can assume a variety of forms but it is necessary that layer 20 must have the same form and dimensions as the primary circuit flow path.

It should be understood, of course, that the foregoing disclosure relates to a preferred embodiment of the invention and that numerous modifications or alterations may be made therein without departing from the spirit and scope of the invention as set forth in the appended claims.

Having thus described the invention, what is claimed is:

1. In a device of the type having a plurality of thin waferlike electrically conductive elements arranged in a given array defining a thin primary electrical current flow path, means for reducing the magnetic field produced by electric current flow through said primary flow path, said means comprising:

a thin waferlike electrically conductive member dimensioned so as to define a secondary electrical current flow path substantially identical with said primary flow path;

mounting means supporting said secondary electrical current flow path in closely spaced alignment with said primary electrical curent flow path; and conductive means connecting said primary flow path and said secondary flow path to create an electrical current flow in said secondary flow path when an electrical current flows though said primary flow path which electrical current flow in said secondary flow path is in an opposite direction from the direction of electrical current flow in the primary flow path and substantially nullifies the magnetic field created by said electrical current flow in said primary flow path.

2. The device of claim 1 wherein said mounting means includes a first thin layer of insulating material between said primary flow path and said secondary flow path.

3. The device of claim 2 wherein said mounting means further includes a second thin layer of insulating material mounted adjacent said secondary flow path so that said secondary flow path is sandwiched between said first and second thin layers of insulating material.

4. The device of claim 3 wherein said mounting means further includes a primary support member mounted adjacent said second thin layer of insulating material so that said second thin layer of insulating material is sandwiched between said primary support member and said member defining said secondary flow path.

5. The device of claim 4 wherein said mounting means further includes bonding means between said primary flow path and said first thin layer of insulating, said first thin layer of insulating material and said secondary flow path, said secondary flow path and said second thin layer of insulating material and said second thin layer of insulating material and said primary support member so that said flow paths, said thin layers of insulating material and said primary support element form a unitary laminated structure.

6. The device of claim 5 wherein said electrically conductive elements defining said primary flow path are solar cells.

7. The device of claim 6 wherein said conductive member defining said secondary flow path comprises an expanded metallic mesh member.

8. The device of claim 7 wherein said primary support member comprises a metallic honeycomb member.

9. A solar cell circuit array having minimal induced magnetic field comprising:

a plurality of thin waferlike solar cells connected to form a first electrical current flow path of a given configuration;

a second electrical current flow path comprised of thin waferlike portions of electrically conductive material conforming to said given configuration;

mounting means supporting said second electrical current flow path in closely spaced aligned array with said first electrical current flow path; and conductive means connecting said first flow path and said second flow path to create an electrical current flowing in a reverse direction from the direction of electrical current flow in said first electrical current flow path in said second flow path in response to electrical current flow in said first flow path so as to effectively nullify the magnetic field produced by current flow in said first flow path.

10. The device of claim 9 wherein said mounting means includes a thin layer of insulating material on both sides of said second flow path so that said second flow path is sandwiched therebetween.

11. The device of claim 10 wherein said mounting means further includes a primary support member of metallic honeycomb formation attached to one of said layers of insulating material and wherein said first flow path is attached to the other insulating layer so that said first and second flow paths, said insulating layers and said primary support member form a unitary laminar structure.

12. The device of claim 11 wherein said thin waferlike portions of electrically conductive material comprising said second flow path are formed of expanded metallic mesh.

13. A method of substantially nullifying the induced magnetic field caused by the passage of sheet electrical current in a given direction through a circuit of thin waferlike conductive elements arranged in a given flow path configuration said method comprising:

causing a reverse sheet current to flow through a flow path having the same thin configuration as said given configuration and closely spaced in aligned array with said given flow path so that the magnetic fields induced by each of said sheet currents effectively nullify each other.

References Cited

UNITED STATES PATENTS

| | | | |
|---|---|---|---|
| 1,735,610 | 4/1930 | Loth | 301—91 X |
| 1,782,875 | 11/1930 | Herz | 307—90 |
| 2,798,434 | 7/1957 | Brill et al. | |
| 2,989,575 | 6/1961 | Wallace | 136—89 |

FOREIGN PATENTS

| | | |
|---|---|---|
| 1,129,220 | 1/1957 | France. |

ALLEN B. CURTIS, *Primary Examiner.*

U.S. Cl. X.R.

174—32; 307—91